Jan. 2, 1945.　　　　　P. ORR　　　　2,366,646
MULTI-ENGINE DRIVE
Filed Jan. 18, 1943
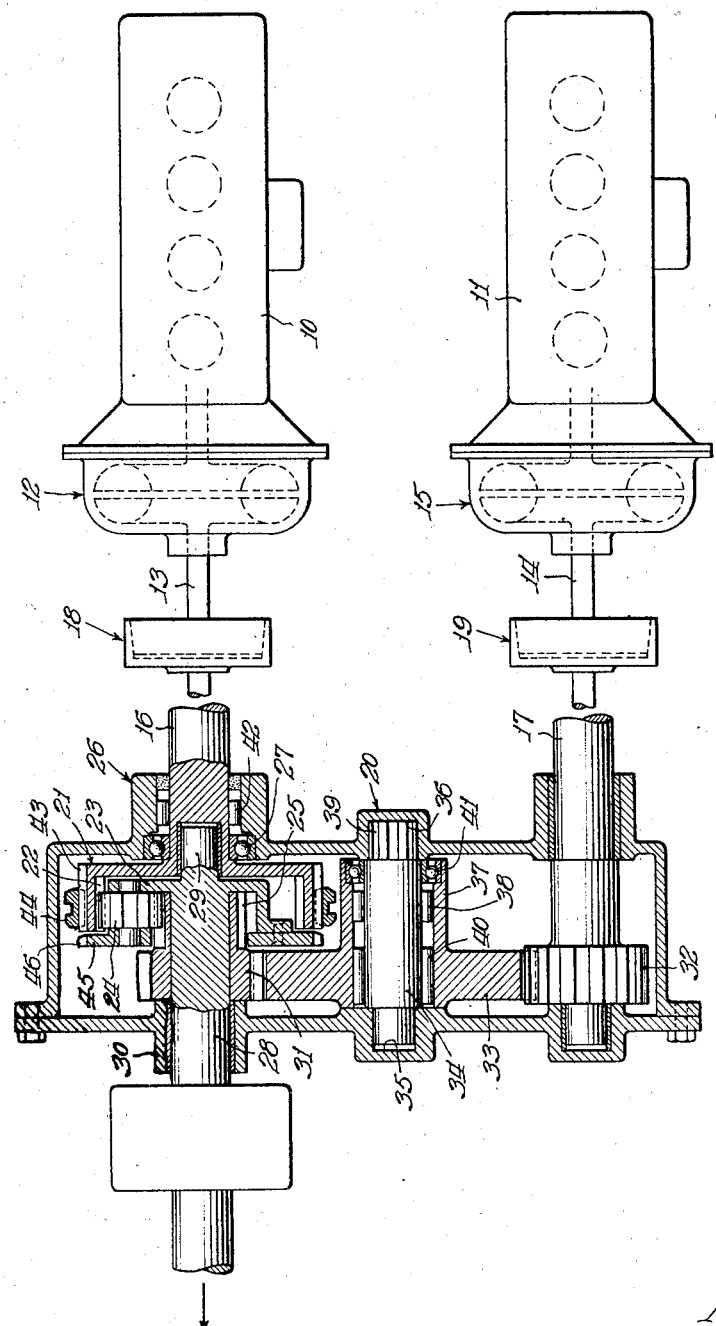
Inventor:
Palmer Orr
By Edward C. Fritzbaugh, Atty.

Patented Jan. 2, 1945

2,366,646

UNITED STATES PATENT OFFICE 2,366,646

MULTIENGINE DRIVE

Palmer Orr, Muncie, Ind., assignor to Borg-Warner Corporation, Chicago, Ill., a corporation of Illinois Application January 18, 1943, Serial No. 472,679

7 Claims. (Cl. 74—282)

This invention relates to a transmission for combining the power of two or more prime movers.

The principal object of this invention is to provide a transmission for a plurality of prime movers wherein any one prime mover may operate singly or some or all of the prime movers may operate simultaneously to drive a single load shaft.

A more specific object of this invention is to provide a differential transmission for combining the power of two prime movers, wherein one of the elements of the differential is automatically made a reaction element when all of the drive is from the other prime mover.

Another specific object of this invention is to provide a differential mechanism for combining the power from two engines, said mechanism being operable to effect such a combination of power regardless of the relative values of the power delivered by the two prime movers, with means for locking the differential so as to provide a direct drive between either or both prime movers and the driven shaft.

These and other specific objects and features of the invention will become apparent from the following specification when taken together with the accompanying drawing wherein the sole figure represents a section taken through the preferred embodiment of the invention, the prime movers and associated apparatus being shown schematically on a reduced scale.

Referring now to the drawing for a detailed description of the invention, a prime mover of any known type whatsoever is shown at 10, and 11 represents another prime mover which may be either of the same type and size as prime mover 10 or may be of a totally different type and size. Thus 10 may be a Diesel engine of large horse power and 11 may be a smaller gasoline engine, or both may be large Diesel, gasoline, electric, or steam engines, or any combination of these types.

An automatically operable connection such as a fluid coupling 12 may be used to connect the prime movers to a drive shaft 13. The coupling may be of the vaned type such as has been used commercially in automobiles. Similarly, prime mover 11 may be connected to a drive shaft 14 by means of a fluid coupling 15. The drive from shafts 13 and 14 is transmitted to input shafts 16 and 17, respectively, by means of disconnectible clutches 18 and 19 respectively. Said clutches 18 and 19 may be of any of the known friction types such as cone, single disc, multiple disc, etc., and are used to positively disconnect either prime mover from the power train.

The transmission 20 is comprised of a differential 21 having a ring gear 22 secured to rotate with input shaft 16, a planet carrier 23 on which are mounted two or more planet gears 24 (only one being shown in the drawing) and a sun gear 25, said ring and sun gears being in mesh with the planet gears.

Shaft 16 is mounted in housing 26 of transmission 20, the support for the shaft being a bearing 27 located near ring gear 22. Carrier 23 is mounted to rotate with the driven or load shaft 28 of the transmission, which load shaft is piloted at one end 29 in input shaft 16 and is supported at the opposite end by a bearing 30 in housing 26. Sun gear 25 rotates with a spur gear 31, and both sun gear 25 and spur gear 31 are rotatably mounted on load shaft 28.

Input shaft 17 drives a spur gear 32 which meshes with an idler gear 33 mounted on a fixed shaft 34 supported in openings 35 and 36 in housing 26. Said idler gear 33 is provided with a tubular extension 37 within which is contained a one-way brake 38. Said brake 38 may be of the roller-and-cam type or any of the well-known sprag, coil spring or ratchet types. Fixed shaft 34 acts as the reaction element for the brake and it is for this reason that shaft 34 is fixed in housing 26. To prevent rotation of shaft 34 one end 39 may be splined into the opening 36. Antifriction bearings such as roller bearing 40 and ball bearing 41 serve to permit free rotation of gear 33 relative to shaft 34. Idler gear 33 meshes with spur gear 31, which as stated above, rotates with sun gear 25. One-way brake 38 is constructed to prevent sun gear 25 from rotating backward relative to the direction of rotation of input shaft 16.

Ring gear 22 is likewise limited to rotation in one direction only (the same direction as sun gear 25), by means of a one-way brake 42 which is mounted between input shaft 16 and housing 26.

The outer periphery of ring gear 22 is provided with teeth 43 on which is mounted an internally toothed collar 44. Carrier 23 is provided with a radial flange 45, the outer periphery 46 of which is likewise toothed. Collar 44 may be slid to the left to engage teeth 46, thereby compelling carrier 23 to rotate with ring gear 22. This effects a lock-up of the differential gearing 21 and causes all elements thereof to rotate at the same speed. In this manner direct drive between input shaft 16 and output shaft 28 is effected, and a fixed ratio is established between input shaft 17 and load shaft 28. If gears 31 and 32 are of the same size, then the ratio between shafts 17 and 28 will be 1:1, i. e., direct drive.

The operation of the transmission is as follows:

Assuming first a condition in which neither prime mover is operating and the load shaft 28 is stationary. If it is desired to operate with prime mover 10 only, clutch 18 is disengaged and said prime mover is started and brought to speed. Clutch 19 is likewise disengaged and remains disengaged as long as prime mover 11 is not operated. To establish a reduced drive through differential 21, clutch 18 is reengaged after collar 44 is disconnected from teeth 46, the sequence of operation, of course, being such that there is no load on collar 44 when it is to be disconnected. The load shaft 28 and carrier 23 will resist rotation and sun gear 25, therefore, will tend to rotate backwardly to absorb the drive. This backward tendency is transmitted to spur gear 31 and idler gear 33 and thence through the tubular extension 37 to one-way brake 38 and stationary shaft 34. One-way brake 38 is so constructed as to prevent rotation of gear 31 in a direction which would result in backward rotation of sun gear 25 and hence sun gear 25 will be stationary and act as a reaction element for the differential gearing 21, thereby establishing positive underdrive in a forward direction in carrier 23 and shaft 28.

If it should be desired to drive driven shaft 28 forwardly at the same speed as input shaft 16 with prime mover 11 still inoperative, clutch 18 is momentarily disengaged to permit collar 44 to come to rest, or at least to approach the speed of carrier 23 and said collar is then engaged with teeth 46 to lock the differential 21, whereupon clutch 18 is reengaged and the drive thus transmitted directly to shaft 28. Under these conditions the direction of rotation of gear 31 is forward and hence one-way brake 38 offers no resistance to such rotation.

Next we consider the condition where prime mover 10 is idle and prime mover 11 becomes the sole source of power. Assuming that an under drive is desired, collar 44 is again disengaged from teeth 46, clutch 18 is disengaged and remains that way and clutch 19 is engaged. Power is then transmitted to clutch 19, input shaft 17, gear 32, idler gear 33, spur gear 31 and sun gear 25 to the planet pinions 24. Here again the load in shaft 28 and carrier 23 resists the turning effort of sun gear 25 and hence there will be a tendency to rotate ring gear 22 in a reverse direction. This tendency, however, is arrested by means of one-way brake 42, thereby causing ring gear 22 to act as a reaction member for the differential gearing 21. Thus with ring gear 22 stationary a reduced drive in a forward direction will be effected in load shaft 28. During such drive, one-way brake 38 associated with idler 33 will be released.

To establish a direct drive, or to remove the reduction in ratio provided by differential gearing 21, as the case may be, clutch 19 is released, collar 44 is engaged with teeth 46 to lock up the differential gearing and clutch 19 is then reengaged, whereupon load shaft 28 will rotate at the same speed as sun gear 25 and its associated gear 31. If gears 31 and 32 are of the same size, then a 1:1 drive will be effected between input shaft 17 and load shaft 28.

Assuming a third condition now, namely, that both engines are to drive the load shaft 28, each engine running at a different speed, under these conditions clutches 18 and 19 are disengaged to permit collar 44 to be disengaged from teeth 46 and then clutches 18 and 19 are reengaged. Since input shaft 17 is rotated in a forward direction and gear 32 is likewise rotated in a forward direction, neither of the one-way brakes 38 and 42 will interfere with their associated gears. Prime mover 10 therefore will rotate ring gear 22 at one speed and prime mover 11 will rotate sun gear 25 through gears 32, 33 and 31 at another speed, the two speeds being combined in the planet gears 24 to drive carrier 23 and load shaft 28 at some speed intermediate the speeds of the two prime movers. Either prime mover may rotate faster than the other. Thus prime mover 10 may be a constant speed Diesel engine and variations in speed in output shaft 28 may be effected by varying the speed of prime mover 11 which may be a high speed gasoline engine.

If direct drive is desired, collar 44 is engaged with teeth 46 and a rigid ratio is maintained between the speed of input shafts 16 and 17 and load shaft 28. Any variations in engine speed are absorbed in the fluid couplings 12 and 15.

Although this invention has been described with reference to a pair of prime movers, it is obvious that two or more pairs may be readily combined, merely by treating the load shafts of each pair as input shafts of similar transmissions. It is to be understood therefore that the scope of the invention is not to be limited to the specific embodiment shown, but is to be determined by the appended claims.

I claim:

1. In combination a plurality of prime movers, a load shaft, and means for transmitting the power from the prime movers to the load shaft, said means including an input shaft for each of the prime movers, a differential gearing having at least three elements for combining the power from the prime movers, one of the elements being connected to the load shaft, another element being driven from one of the prime movers and the third element being driven from another prime mover, and means for selectively fixing the speed ratio between one of the input shafts and the load shaft, said last-mentioned means comprising a toothed element driven with the load shaft, a toothed element driven with the input shaft and a toothed collar adapted to engage both toothed elements to form a rigid connection therebetween.

2. In combination a plurality of prime movers, a load shaft and means for transmitting the power from the prime movers to the load shaft, said means including input shafts connected to each prime mover, a planetary gear set for combining the paths, said planetary gear set comprising a ring gear connected to rotate with one of the input shafts, a sun gear driven from another of the input shafts and a planet carrier connected to the load shaft, means for locking the planetary gear set to provide a fixed ratio drive between the input and output shafts, said last-mentioned means comprising external teeth on the ring gear, aligned external teeth on the carrier, and an internally toothed collar adapted to engage both sets of teeth to lock the planetary.

3. In combination a plurality of prime movers, a load shaft and means for transmitting the power from the prime movers to the load shaft, said means including an input shaft for each of the prime movers, differential gearing including sun, ring and planet gears for combining the power from the input shafts and transmitting the combined power to the load shaft, said ring gear being connected to one of the input shafts, a train of gears connecting the sun gear to another of the input shafts, a one-way brake means associated with the train of gearing to prevent the sun gear from rotating in a reverse direction relative to the ring gear when the prime mover associated with the input shaft connected to the train of gearing is inoperative, said train of gearing comprising a gear driven by the sun gear input shaft, a gear rotatable with the sun gear and an idler gear meshing with the remaining gears of the train, said one-way brake mechanism being associated with the idler gear.

4. In combination a plurality of prime movers, a load shaft and means for transmitting the power from the prime movers to the load shaft, said means including an input shaft for each of the prime movers, differential gearing including sun, ring and planet gears for combining the power from the input shafts and transmitting the combined power to the load shaft, said ring gear being connected to one of the input shafts, a train of gears connecting the sun gear to another of the input shafts, a one-way brake means associated with the train of gearing to prevent the sun gear from rotating in a reverse direction relative to the ring gear when the prime mover associated with the input shaft connected to the train of gearing is inoperative, said train of gears comprising a gear connected to rotate with the said one of the input shafts, a gear connected to rotate with the sun gear and an idler gear meshing with both said gears of the train, a non-rotatable shaft supporting the idler gear, and spaced antifriction rollers and a roller-type one-way brake device intermediate the idler and the non-rotatable shaft.

5. In combination a plurality of prime movers, a load shaft and means for transmitting the power from the prime movers to the load shaft, said means including an input shaft for each of the prime movers, differential gearing including sun, ring and planet gears for combining the power from the input shafts and transmitting the combined power to the load shaft, said ring gear being connected to one of the input shafts, a train of gears connecting the sun gear to another of the input shafts, a one-way brake means associated with the train of gearing to prevent the sun gear from rotating in a reverse direction relative to the ring gear when the prime mover associated with the input shaft connected to the train of gearing is inoperative, and a positive clutch for connecting the ring gear to the planet carrier to provide a direct drive between the shaft connected with the ring gear and the load shaft.

6. In combination, a pair of prime movers, a load shaft and means for transmitting the power from the prime mover to the load shaft, said means including a shaft for each prime mover, a planetary gear set comprising a ring gear, a sun gear, planet gears meshing with the ring and sun gears and a planet gear carrier, said carrier being connected to rotate with the load shaft and said ring gear being connected to rotate with one of the prime mover shafts, a train of gearing connecting the other prime mover shaft with the sun gear, said train comprising a gear mounted to rotate with the other prime mover shaft, a gear connected to rotate with the sun gear and an idler gear meshing with the gear mounted to rotate with the other prime mover shaft and the gear connected to rotate with the sun gear, a stationary shaft for supporting the idler, a roller-and-cam one-way brake device operating between the stationary shaft and the idler to prevent the idler from rotating in a direction corresponding to backward rotation of the sun gear, a roller-and-cam one-way brake device cooperating with the shaft for the first-mentioned prime mover for preventing said shaft from rotating backwardly, and a positive clutch for locking-up the planetary gearing for direct drive.

7. The combination described in claim 6, said positive clutch comprising external teeth on the ring gear, an externally toothed flange on a carrier and an internally toothed slidable collar adapted to connect the external teeth on the ring gear with the teeth on the carrier flange.

PALMER ORR.